United States Patent [19]

Carney et al.

[11] Patent Number: 4,808,058

[45] Date of Patent: Feb. 28, 1989

[54] BATTERY HANDLING MACHINE

[76] Inventors: Wayne D. Carney, 110 Sherwood Ave., Toronto, Ontario, Canada, M4P 2A7; Wayne D. Patterson, 31 Alphonse Crescent, Mississauga, Ontario, Canada, L5M 1A4

[21] Appl. No.: 102,442

[22] Filed: Sep. 29, 1987

[51] Int. Cl.$^4$ .............................................. B60P 1/32
[52] U.S. Cl. .................................. 414/343; 414/349; 414/352; 414/280; 414/661; 414/396; 414/785; 414/749; 104/34
[58] Field of Search ......................... 104/34; 180/68.5; 414/340, 341, 343, 344, 345, 349, 350, 351, 396, 400, 352, 353, 278, 279, 280, 281, 373, 659, 661, 498, 499, 501, 785, 585, 559, 749, 500; 105/51

[56] References Cited

U.S. PATENT DOCUMENTS

| | | |
|---|---|---|
| 1,764,354 | 6/1930 | Schellentrager et al. ............ 104/34 |
| 2,907,479 | 10/1959 | Cunningham ................... 414/280 X |
| 3,150,787 | 9/1964 | Patrignani ........................... 414/661 |
| 3,259,365 | 7/1966 | Gibson .............................. 104/34 X |
| 3,710,961 | 1/1973 | Bomstein ............................. 414/396 |
| 4,120,411 | 10/1978 | Johnson .............................. 414/351 |
| 4,283,164 | 8/1981 | Reaney ................................ 414/396 |
| 4,342,533 | 8/1982 | Hane ................................... 414/396 |

FOREIGN PATENT DOCUMENTS 2480115  10/1981  France ................................ 414/785

Primary Examiner—Frank E. Werner
Attorney, Agent, or Firm—Rogers & Scott

[57] ABSTRACT

The invention provides conveying apparatus consisting of a framework adapted to stand beside a vehicle and having a floor in substantial alignment with a battery support bed of the vehicle. Longitudinal track devices extend parallel to the floor on the framework and spaced from the floor to receive the battery between the floor and the track devices. A transport mechanism has drive devices coupled to the track devices for operation to move the transport mechanism longitudinally along the track devices and a coupling assembly is attached to the transport mechanism for movement with the transport mechanism and includes an upwardly biased connector adapted to releasably engage the battery so that on operation of the transport mechanism the battery may be loaded onto or unloaded from the floor.

6 Claims, 3 Drawing Sheets

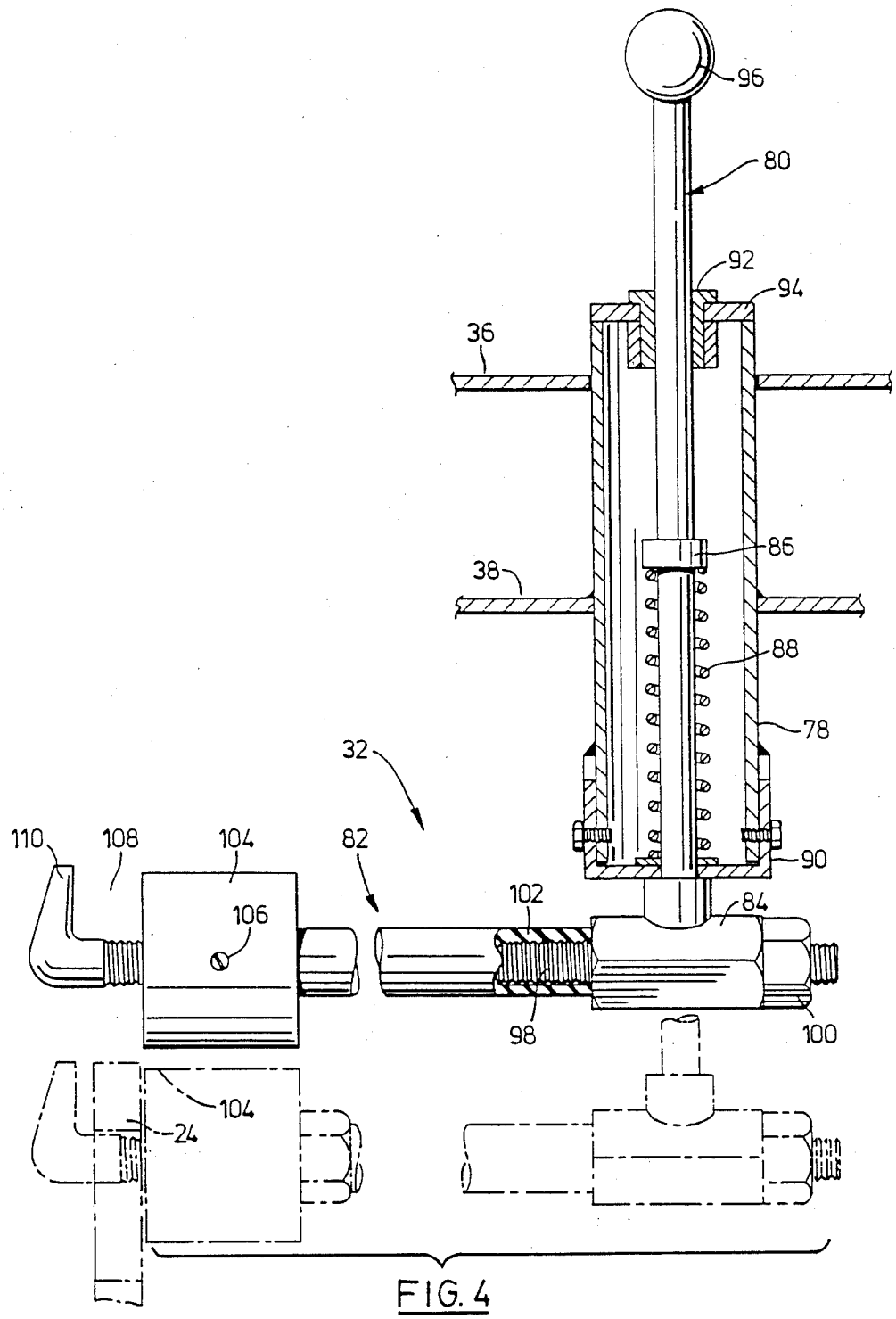

BATTERY HANDLING MACHINE

This invention relates to conveying apparatus for servicing batteries of electrically driven vehicles of the type having batteries entered horizontally through a side opening in the vehicle and supported by a bed in the vehicle.

Electrically driven vehicles such as those used in factories to move goods around the factory, use batteries which must be serviced periodically. In order that such vehicles can be used as efficiently as possible, it is desirable that servicing of the batteries can be made with the batteries removed from the vehicles and that fresh batteries be placed in the vehicles upon such removal. To facilitate this, batteries are commonly arranged either to be lifted out of the vehicles by a crane or removed from the sides of the vehicles by pulling or pushing the batteries out of the vehicles onto stands where they can be serviced. This invention relates to apparatus for servicing batteries in the latter type of situation, rather than those which are to be lifted by a crane.

Commonly, batteries are provided with end plates which project above the battery and define openings for crane hooks or other equipment to lift the battery. When batteries are to be moved from the side of vehicles, a bed of rollers is commonly positioned adjacent a battery and the battery is then manhandled out of the vehicle onto the bed of rollers. Because of the weight of the batteries, it is not uncommon for a service area to be cluttered by batteries in service with heavy cables from charging apparatus connected to the batteries. Personnel who must move the batteries and personnel who must service the batteries run the risk of injury due to the weight and caustic contents of the batteries.

It is an object of the present invention to provide conveying apparatus which facilitates the removal and replacement of a battery from vehicles having side openings through which the battery is entered and withdrawn.

Accordingly, in one of its aspects, the invention provides conveying apparatus consisting of a framework adapted to stand beside a vehicle and having a floor in substantial alignment with a battery support bed of the vehicle. Longitudinal track means extends parallel to the floor on the framework and spaced from the floor to receive the battery between the floor and the track means. A transport mechanism has drive means coupled to the track means for operation to move the transport mechanism longitudinally along the track means and a coupling assembly is attached to the transport mechanism for movement with the transport mechanism and includes an upwardly biased rigid connector adapted to releasably engage the battery so that on operation of the transport mechanism the battery may be loaded onto or unloaded from the floor.

The conveying apparatus can also be used to offload the battery at a servicing location whereupon it may be used to place a fresh battery into the vehicle.

This and other aspects of the invention will be better understood from the following description which is made with reference to the accompanying drawings, in which.

Figure 5:
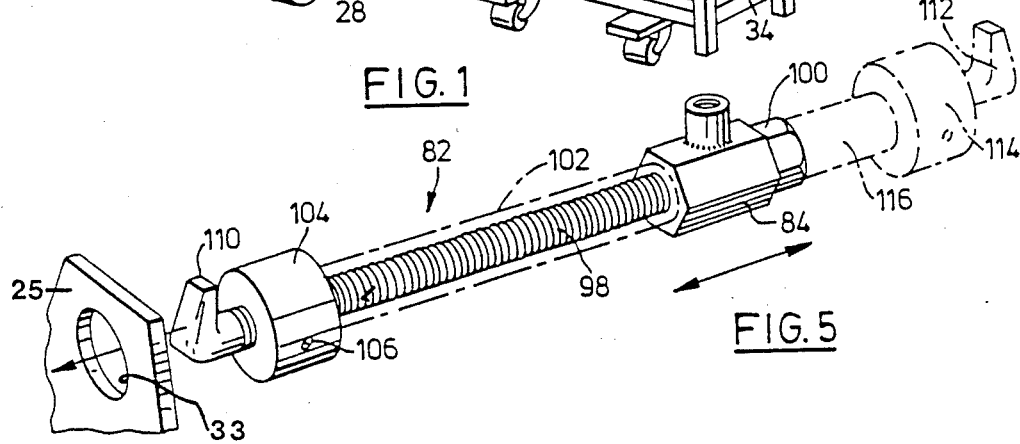
Figure 3:
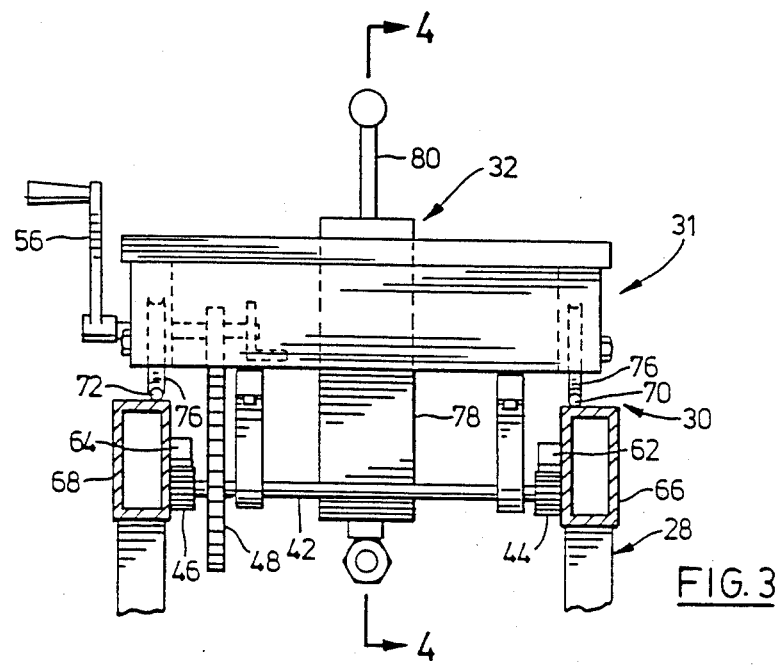
FIG. 3 is an end view of the transport mechanism seen from the rear of FIG. 2 as drawn, illustrating the transport mechanism in operative co-operation with track means (shown in cross-section)

FIG. 4 is a sectional view on line 4—4 of FIG. 3 illustrating a coupling assembly for engaging a battery and showing in ghost outline the coupling assembly in engagement with a battery wall; and FIG. 5 (drawn adjacent FIG. 1) is a perspective view with portions shown in ghost outline of part of the coupling assembly of FIG. 4, the ghost outline portion of this figure demonstrating an alternative embodiment.

Figure 1:
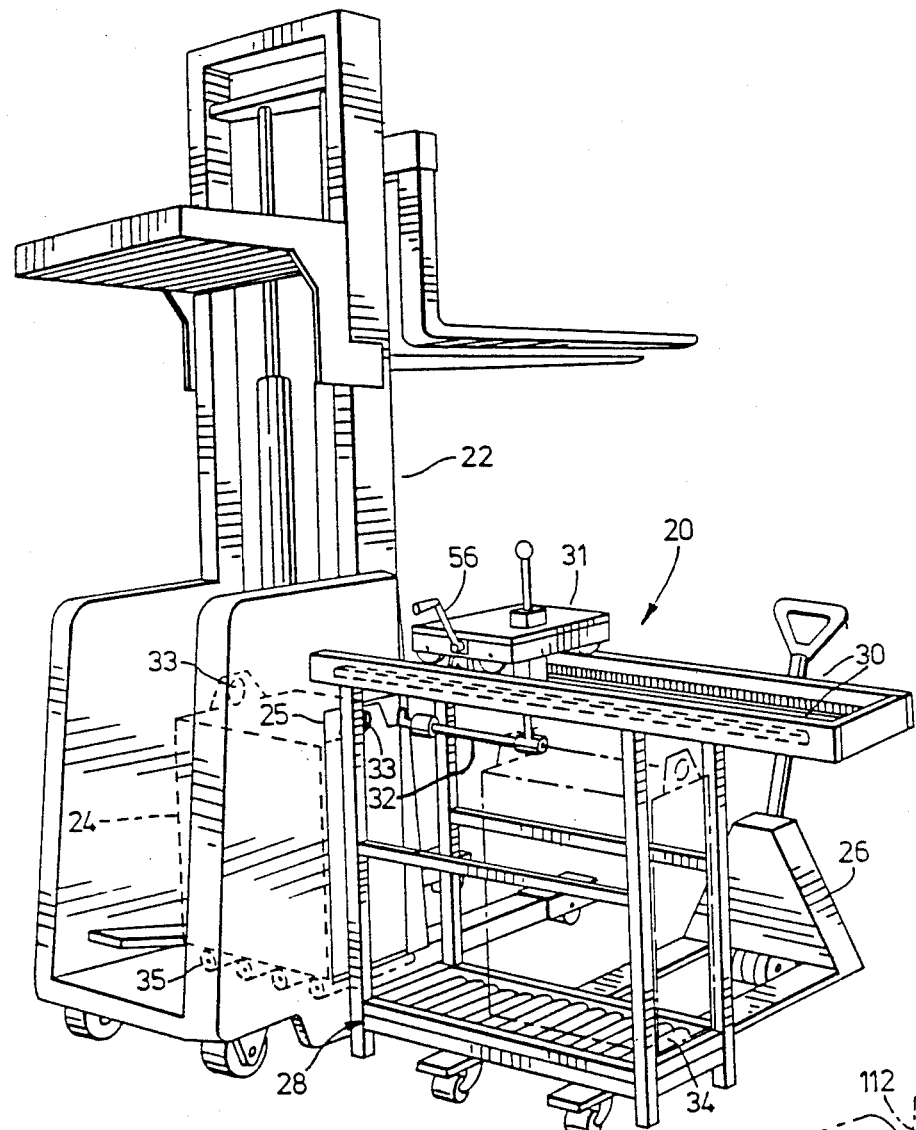
FIG. 1 is a perspective view of the preferred embodiment of conveying apparatus for servicing batteries according to the invention and shown in use removing a battery from a fork lift vehicle.

Reference is made firstly to FIG. 1 which illustrates conveying apparatus for servicing batteries indicated generally by the numeral 20 standing beside an exemplary fork lift vehicle 22 to remove a battery 24 horizontally from the vehicle 22 through a side opening 25 and place it in a position shown in ghost outline in the apparatus 20. For convenience, the conveying apparatus 20 is supported on a conventional hand propelled pallet lifter 26 as will be explained. The conveying apparatus 20 has a framework 28 which includes at an upper end a longitudinal, horizontally extending track 30 and also has a transport mechanism 31 movable along the track 30 in either direction. The transport mechanism 31 has a coupling assembly 32 for engaging any one of a pair of openings 33 provided at the top of end plates forming the sides of the battery 24 and is associated with drive means operational to move the transport mechanism 31 along the track 30 and to draw the battery 24 out of the fork lift vehicle 22 onto a roller floor 34. the roller floor 34 comprises a plurality of parallel rollers supported at a lower end of the framework 28 and is spaced from the ends of framework legs 35 so as to accomodate beneath it a movable support platform in the form of the forks of the pallet lifter 26. The roller floor 34 is in substantial horizontal alignment with a battery support bed 35 of the fork lift vehicle 22 which conveniently is also made of rollers, and is located below the track 30 in spaced parallel relationship so as to accomodate above it the battery 24.

Figure 2:
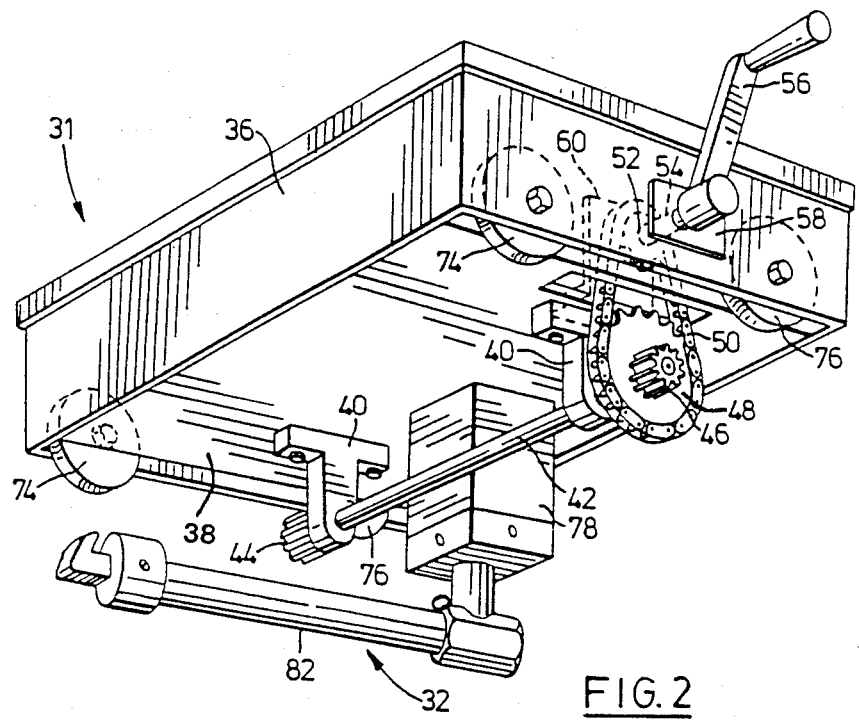
FIG. 2 is a perspective view looking from below part of a transport mechanism forming part of the apparatus.

Reference is next made to FIGS. 2 and 3 to describe the transport mechanism 31 and its position on the framework 28. With particular reference to FIG. 2, it can be seen that the transport mechanism 31 consists of a main body 36 generally in the form of a box and having a base 38 from which is supported a pair of downwardly-extending bearing pedestals 40 carrying a shaft 42. This shaft 42 has at its ends first and second pinions 44, 46 and, adjacent to second pinion 46 there is a chain wheel 48 carrying a chain 50 which also passes around a sprocket 52 on a shaft 54 associated with a crank 56. Shaft 54 is carried between a plate 58 on the side of the main body 36 and an internal support bracket 60. As a result, movement of the crank 56 will drive the pinions 44, 46 which, as seen in FIG. 3, are in engagement with a pair of racks 62, 64. These racks 62, 64 together with pinions 44, 46, chainwheel 48, chain 50, sprocket 52, shaft 54, and crank 56 comprise the drive means for moving the transport mechanism 31 and are welded to parallel top members 66, 68 of the framework 28. The top members 66, 68 form part of the track 30 and have rod-shaped rails 70, 72 welded to the upper surfaces of respective top members 66, 68. Rails 70, 72 are adapted, in use, to receive two pairs of grooved wheels 74, 76 (FIG. 2) which are mounted for rotation in the main body 36 so that the transport mechanism 31 is free to ride on the rails 70, 72. The transport mechanism 31 can move in either direction along the track 30 depending upon the direction of rotation of the crank 56.

As also seen in FIGS. 2 and 3, the transport mechanism 31 has, as part of the assembly, the coupling assembly 32. this consists essentially of a housing 78 attached to and extending vertically through the main body 36 so as to project above and below the transport mechanism 31. A plunger 80 housed in the housing 78 projects from the upper end of the housing 78 where it can be accessed by a user and also projects below the transport mechanism 31 such that the vertical position of a connector 82 extending horizontally from the lower end of the plunger 80 can be changed by movement of the plunger. By rotating the plunger 80, the connector 82 can also be moved with the plunger 80 about a vertical axis. Details of the coupling assembly 32 will be described with reference to FIG. 4. For the moment, it is sufficient to understand that the connector 82 is dimensioned such that it can be positioned in one of the battery openings 33 (see FIG. 1) for engagement with the battery 24 to draw it out of the forklift vehicle 22.

Reference is now made to FIG. 4 to describe the coupling assembly 32 in more detail. Here it will be seen that the plunger 80 extends through the housing 78 and is attached at its lower end to a T-piece 84. The plunger 80 carries a collar 86 intermediate its ends to trap a compressed coil spring 88 between the plunger 80 and a bottom piece 90 of the housing 78. The plunger 80 sits in a bushing 92 supported by a top assembly 94 of the housing 78 and has a knob 96 at its upper end so that a user can move the plunger 80 downwardly or rotate it to change the position of the connector 82.

The plunger 80 is spring biased such that if the plunger 80 is pushed downwardly, the coil spring 88 is compressed and the connector 82 moves into a downwardly spaced position such as that shown in ghost outline. On releasing the plunger 80 (with the coupling assembly 32 disengaged from the battery 24), the energy stored in the coil spring 88 biases the plunger 80 towards an uppermost position and the connector 82 is returned to the position shown in full outline.

In use, with the coupling assembly 32 engaging the battery 24, and the battery 24 supported on the roller floor 34, it will be understood that any irregularities in the roller floor 34 or in the bottom of the battery 24 will be compensated by the upward biasing of the coil spring 88 such that the battery 24 will tend to float above the roller floor 34.

The connector 82 includes the T-piece 84 which is threaded to receive a threaded rod 98 locked in place by a lock nut 100 located near one end of the threaded rod 98. The other end of the threaded rod 98 is received in one end of a partially threaded collar 104 made from bakelite and is locked in place by a set screw 106. The other end of the collar 104 receives a threaded shaft supporting a hooked end piece 110 forged on the end of the shaft. The arrangement is such that the hooked end piece 110 can be moved relative to the collar 104 to change the width of a gap 108 existing between the collar 104 and the hooked end piece 110.

The space 108 is proportioned to provide clearance and yet locate on the end plate of the battery 24 with the hooked end piece 110 through one of said openings 33 in the battery 24 and positioned somewhat in the manner shown in ghost outline in FIG. 4. To insert the hooked end piece 110, the plunger 80 is lowered, by grasping knob 96, to a level where the hooked end piece 110 is aligned with the selected opening 33 and the coil spring 88 is compressed for biasing the hooked end piece 110 upwardly. The crank 56 (FIG. 1) is then turned to drive the transport mechanism 31 along the track 30 towards the selected opening 33 and the hooked end piece 110 is inserted. Releasing knob 96 allows the hooked end piece 110 to move up and engage the end plate of the battery 24 above the selected opening 33 such that the end plate is gripped between the hooked end piece 110 and the collar 104. The battery 24 is thus firmly coupled to the transport mechanism 31 for movement with it, in either direction, along the track 30.

The connector 82 also includes a length of neoprene tubing 102 which extends about the threaded rod 98 between the T-piece 84 and the collar 104. It will be understood that said neoprene tubing 102 and bakelite collar 104 are made of insulating material so that any danger of short-circuiting the battery 24 between the hooked end piece 110 and the T-piece 84 or lock nut 100 is averted.

Reference is now made to FIG. 5 which illustrates the connector 82 in more detail and also shows in ghost outline an additional part which would constitute an alternative embodiment. As seen in FIG. 5, the threaded rod 98 can be arranged to have a second hooked end piece 112 and second collar 114 spaced from the T-piece 84 by a shorter length of neoprene tubing 116 than the tubing 102. This effectively makes the connector 82 double-ended with two different reaches. As a result, the connector 82 can be rotated through 180 degrees to get different reaches to either side of the vertical axis of the plunger 80 and to facilitate a better positioning of the transport mechanism 31 depending upon the circumstances in use.

Returning to FIG. 1, it will be evident that the apparatus 20 is used to remove a battery 24 by first connecting the coupling assembly 32 in one of said openings 33 of the battery end plate and then operating the crank 56 to cause the transport mechanism 31 to draw the battery 24 onto the roller floor 34 of the conveying apparatus 20.

The track 30 on the framework 28 overhangs the roller floor 34 to permit the transport mechanism 31 to draw the battery 24 into the position shown in ghost outline without running out of rails 70, 72. Once the battery 24 is removed, the battery 24 complete with the conveying apparatus 20 may be taken to a battery servicing location using the pallet lifter 26 if the forklift vehicle 22 is not already at a battery servicing location and a different conveying apparatus carrying a fresh battery can be used to place a fresh battery in the forklift vehicle 22.

Alternatively, the conveying apparatus 20 may be off-loaded and the battery 24 moved off the roller floor 34 onto a simple stand for servicing, thereby freeing the conveying apparatus 20 to place a fresh battery in the forklift vehicle 24.

It will be understood that in order to off-load the apparatus 20, the crank 56 need merely be operated in a direction such that the transport mechanism 31 pushes the battery 24 off the roller floor 34. Alternatively, the coupling assembly 32 is disconnected from the battery 24 so that the connector 82 may be rotated through 180° about the axis of the plunger 80. The coupling assembly 32 is then moved along the track means 30 for reconnection to the battery 24 in a selected opening 33 such that the battery 24 may be pulled from the roller floor 34 and moved onto a stand.

Once the battery 24 has been unloaded, the transport mechanism 31 is disconnected from the battery 24 and the conveying apparatus 20 can then be moved using the pallet lifter 26 to a location where it receives a fresh battery which is then brought to the forklift vehicle 22 for placing in the forklift vehicle 22. The transport mechanism 31 is used first to pull the battery onto the roller floor 34 and then to push the battery into the vehicle, off the roller floor 34.

It will further be understood that several variations may be made to the above-described embodiment of the invention, as will occur to those skilled in the art, without departing from the claimed scope thereof. In particular, the transport mechanism and associated coupling assembly and drive means may vary considerably. The drive means could, for example, be motorized thereby obviating manual operation of the crank to move the transport mechanism along the track means. The drive means could also comprise a rope and pulley arrangement or other suitable alternative. The length and position of the track means relative to the floor could also vary considerably, as required.

The invention thus provides an improved means for conveying batteries requiring servicing in vehicles of the type described above.

We claim:

1. Conveying apparatus for servicing a battery in a vehicle of the type having a battery entered horizontally through a side opening in the vehicle, the battery, in use, sitting on a battery support bed in the vehicle and the apparatus comprising:
   a framework having a longitudinal axis which includes a floor positioned to be in substantial alignment with the battery support bed so as to receive and support the battery, the floor including a plurality of parallel rollers located transverse to the longitudinal axis of the framework to facilitate movement of the battery across the floor;
   longitudinal track means forming part of the framework and spaced from the floor to accomodate the battery between the track means and the floor;
   a transport mechanism including rack and pinion drive means having pinion means carried by a body, the pinion means being coupled to rack means provided on the track means for operation to move the body longitudinally along the track means in either direction;
   rail means on the track means to guide wheels provided on the body; and
   a coupling assembly attached to the transport mechanism for movement with the body and including a connector adapted to releasably engage the battery whereby on operation of the drive means the battery may be loaded onto or unloaded from the floor.

2. Apparatus according to claim 1 in which the connector is a rigid member extending along the axis of the framework between the track and the floor and the connector is attached to an upwardly biased vertically extending plunger rotatable in a housing attached to the body of the transport mechanism whereby the position of the connector may be adjusted for engaging the battery and irregularities in the floor or the bottom of the battery will be compensated during loading or unloading of the battery.

3. Apparatus according to claim 2 in which the connector has an upwardly extending hooked end piece spaced from a collar supported on the connector, the end piece being adapted to engage a battery wall above an opening in the battery wall such that the battery wall is received between the end piece and the collar, the hooked end piece having a threaded shank and the collar being similarly threaded to receive said shank such that the hooked end piece and the collar define a variable space for receiving the battery wall.

4. Conveying apparatus for servicing a battery in a vehicle of the type having a battery entered horizontally through a side opening in the vehicle, the battery, in use, sitting on a battery support bed in the vehicle and the apparatus comprising:
   a framework having a longitudinal axis which includes a floor positioned to be in substantial alignment with the battery support bed so as to receive and support the battery, the floor including a plurality of parallel rollers located transverse to the longitudinal axis of the framework to facilitate movement of the battery across the floor;
   longitudinal track means forming part of the framework and spaced from the floor to accomodate the battery between the track means and the floor;
   a transport mechanism including rack and pinion drive means having pinion means carried by a body, the pinion means being coupled to rack means provided on the track means for operation to move the body longitudinally along the track means in either direction;
   rail means on the track means to guide wheels provided on the body;
   a coupling assembly attached to the transport mechanism for movement with the body and including a connector adapted to releasably engage the battery whereby on operation of the drive means the battery may be loaded onto or unloaded from the floor, the connector being a rigid member extending along the axis of the framework between the track and the floor and the connector being attached to an upwardly biased vertically extending plunger rotatable in a housing attached to the body of the transport mechanism whereby the position of the connector may be adjusted for engaging the battery and irregularities in the floor or the bottom of the battery will be compensated during loading or unloading of the battery.

5. Apparatus according to claim 4 in which the connector has an upwardly extending hooked end piece spaced from a collar supported on the connector, the end piece being adapted to engage a battery wall above an opening in the battery wall such that the battery wall is received between the end piece and the collar, the hooked end piece having a threaded shank and the collar being similarly threaded to receive said shank such that the hooked end piece and the collar define a variable space for receiving the battery wall.

6. Conveying apparatus for servicing a battery in a vehicle of the type having a battery entered horizontally through a side opening in the vehicle, the battery, in use, sitting on a battery support bed in the vehicle and the apparatus comprising:
   a framework having a longitudinal axis which includes a floor positioned to be in substantial alignment with the battery support bed so as to receive and support the battery, the floor including a plurality of parallel rollers located transverse to the longitudinal axis of the framework to facilitate movement of the battery across the floor;

longitudinal track means forming part of the framework and spaced from the floor to accomodate the battery between the track means and the floor;

a transport mechanism including rack and pinion drive means having a pair of spaced parallel pinion means carried by a body, the pinion means being coupled to a pair of correspondingly spaced parallel rack means provided on the track means for operation to move the body longitudinally along the track means in either direction;

rail means on the track means to guide wheels provided on the body; and a coupling assembly attached to the transport mechanism for movement with the body and including a connector adapted to releasably engage the battery whereby on operation of the drive means the battery may be loaded onto or unloaded from the floor, the connector being a rigid member extending along the axis of the framework between the track and the floor and the connector being attached to an upwardly biased vertically extending plunger rotatable in a housing attached to the body of the transport mechanism whereby the position of the connector may be adjusted for engaging the battery and irregularities in the floor or the bottom of the battery will be compensated during loading or unloading of the battery.

* * * * *